(12) United States Patent
Pegg et al.

(10) Patent No.: US 7,769,291 B2
(45) Date of Patent: Aug. 3, 2010

(54) OPTICAL COMMUNICATION NETWORK AND COMPONENT THEREFORE

(75) Inventors: Steven Ian Pegg, Northamptonshire (GB); Julien Nicholas Vincent Poirrier, Locquemeau (FR); Robert Richard Packham, Coventry (GB); Hayden Scott Fews, Coventry (GB)

(73) Assignee: Ericsson AB, Stockholm (SE)

( * ) Notice: Subject to any disclaimer, the term of this patent is extended or adjusted under 35 U.S.C. 154(b) by 775 days.

(21) Appl. No.: 10/596,787

(22) PCT Filed: Dec. 14, 2004

(86) PCT No.: PCT/EP2004/053441
§ 371 (c)(1),
(2), (4) Date: Apr. 3, 2007

(87) PCT Pub. No.: WO2005/064826
PCT Pub. Date: Jul. 14, 2005

(65) Prior Publication Data
US 2007/0292130 A1 Dec. 20, 2007

(30) Foreign Application Priority Data
Dec. 23, 2003 (DE) .............................. 103 60 788

(51) Int. Cl.
*H04B 10/08* (2006.01)
(52) U.S. Cl. ........................ 398/21; 398/13; 398/15; 398/20; 398/28

(58) Field of Classification Search .................. 398/20, 398/13, 15, 21, 28, 30, 33, 83, 97, 102, 161, 398/169, 170, 10, 11, 16, 17, 18, 25, 31; 356/73.1, 477, 455
See application file for complete search history.

(56) References Cited

U.S. PATENT DOCUMENTS

| | | | |
|---|---|---|---|
| 6,111,676 A * | 8/2000 | Lemus et al. .................. | 398/1 |
| 6,301,036 B1 | 10/2001 | Spencer | |
| 6,317,255 B1 * | 11/2001 | Fatehi et al. ........... | 359/341.44 |
| 6,519,026 B1 | 2/2003 | Holland | |

FOREIGN PATENT DOCUMENTS

| DE | 19933268 | 1/2001 |
|---|---|---|
| EP | 1241805 | 9/2002 |

* cited by examiner

*Primary Examiner*—M. R. Sedighian
(74) *Attorney, Agent, or Firm*—Coats & Bennett, P.L.L.C.

(57) ABSTRACT

A component for an optical communication network comprises a source (6) for an optical communication signal, an output port (11) for outputting the optical communication signal on an optical transmitting fiber (1), a light sensor (14; 15) and an optical circulator (9) for transmitting the optical communication signal from the source (6) to the output port (11) and for transmitting light reflected or received from outside at the output port (11) to the light sensor (14; 15). The light sensor (14, 15) has an evaluation circuit (13) connected to it for detecting a time delay between a time marker of a light signal from the source and the corresponding time marker of the light arriving at the light sensor (14; 15).

18 Claims, 2 Drawing Sheets

OPTICAL COMMUNICATION NETWORK AND COMPONENT THEREFORE

The present invention relates to an optical communication network and to a component therefore, such as a network node or a intermediate amplifier for re-amplifying an optical communication signal on an optical fibre between two network nodes.

Usually, in such a network component, as schematically shown in FIG. 1, on the path of the optical communication signal from a source, such as a laser modulated with an electric communication signal or a laser amplifier 6, to an output port 11 of the component connected to an optical fibre 1, there is a tap in the form of a four-gate directional coupler 10 which branches off a small fraction of the optical output signal of the source 6 to an output signal monitor 12 and, in case of a malfunction in the connected optical fibre causing a back reflection, branches off part of the back-reflected intensity to a back-reflection monitor 14. The intensity fraction branched off in the directional coupler is the same for both transmission directions. In order to be able to feed the optical communication signal with as high an intensity as possible into the fibre, it is desirable to keep the branched-off fraction as small as possible. Accordingly, the fraction of the back-reflected intensity which is branched off by the directional coupler to the back-reflection monitor is small, too. The major part of the back-reflected intensity passes the directional coupler towards the source, so that between the coupler and the source, an optical isolator must be provided in order to protect the source from possible reflections.

Due to the little intensity that reaches the back-reflection monitor in case of a malfunction, a sensitive and expensive monitor must be used in order to detect an interruption of the optical fibre with the reliability necessary for automatically reducing the power of the source with certainty and thus to prevent the optical communication signal from escaping into free space at an intensity that might cause eye damage.

From U.S. Pat. No. 6,317,255, a component for an optical communication network is known in which the directional coupler and the optical isolator are replaced by an optical circulator which transmits, on the one hand, the optical communication signal from the source to the output port of the component and, on the other hand, reflected light arriving at the output port of the component from e.g. a defective optical fibre to a light sensor in order to detect defects of the fibre. A directional coupler for monitoring the operation of the source is located at the output fibre issuing from the circulator.

In this prior art device the intensity detected by the light sensor is monitored in order to decide whether there is a defect or not. If it is decided that there is a defect, this prior art device may reduce the light intensity delivered at the output port, in order to prevent uncontrolled emission of laser light from the fibre that might cause danger to persons, but information about the location of the failure cannot be obtained.

For localising a defect in an optical fibre between two network components, it is known to separate the fibre at one end from the corresponding network component and to connect it to a an optical time domain reflectometry (OTDR) device. Such a device comprises a light source capable of feeding short light impulses into the fibre and a light sensor having a high temporal resolution, which enables to measure the delay between the emission of the light impulse and the arrival at the OTDR device of the portion of the light impulse reflected at the defect, and to calculate based on this delay the distance of the defect from the end of the fibre to which the OTDR device is connected. Such a procedure is laborious and expensive, on the one hand due to the cost of the OTDR device itself, on the other hand due to the labour involved in its use, since every time when a malfunction is detected in an optical fibre, the OTDR device must be brought to at least one of the two network components connected to the ends of the fibre, the optical fibre must be separated from the network component and must be connected to the OTDR device in order to carry out the measurements.

The object of the invention is to provide an optical communication network and a component therefore which, in case of a defect of an optical fibre, allow to determine the location of the defect in a short time and with minimal effort.

On the one hand, the object is achieved by a component for an optical communication network having the features of claim 1.

Due to the use of the optical circulator, in case of a malfunction, there is enough light available at the location of the light sensor to carry out a time-resolved measurement of the light intensity. By applying a time marker to the light signal emitted by the source on the one hand and detecting the arrival time at the light sensor of the same time marker in a light signal reflected by the defect, the propagation delay of the light signal from the concerned component to the defect and thus, the distance of the defect from the component may be detected.

Preferably, the component comprises means for transmitting a detected value of the delay on the communication network to a central authority, from where an assignment of staff for repairing the damaged fibre may be triggered. When the geographic course of the fibre and the distance of the defect from the component signalising it are known, the location of the defect can be determined at the central authority so exactly that a visit to the concerned component becomes superfluous in most cases, and the location of the defect may be visited directly.

If the communication signal provided by the source is a frequency-domain multiplex signal, the light sensor preferably is selective for part of the frequency components, preferably for a single frequency component, of the frequency-domain multiplex communication signal. Preferably, the part of the frequency components for which the light sensor is sensitive comprises a filling channel or an OSC channel, since in these two types of channels it is possible to apply a time marker for a distance measurement without at the same time corrupting communication signal components transmitted on other channels. Thus, in case that the defect of the fibre is not a complete interruption, communication remains possible, although, maybe, to a reduced extent.

Preferably the network component is bi-directional, i.e. it further comprises at least one input port for connecting to an optical input fibre and a receiving part therefore.

According to the invention, an optical switch is provided between the receiving fibre and the receiving part which enables to connect the receiving part arbitrarily, to the receiving fibre under normal operation, or to the circulator in case of a defect, in order to use the receiving part as the light sensor described above. Such a double use of the receiving part usually does not affect the usefulness of the receiving part for receiving via the receiving fibre, if this receiving fibre and the monitored transmitting fibre extend in one strand to a same second component of a network, because then in case of an interruption of the transmitting fibre, in most cases the entire strand is interrupted and there are no signals arriving on the receiving fibre, for the receipt of which the receiving part should remain connected to the receiving fibre.

Here, too, the receiving part preferably is an OSC receiver.

The switch is preferably controlled based on the intensity of light propagating back from the output port to the circulator, which back-propagating light may be detected by the same light sensor as mentioned above or by another light sensor.

It is also useful that the network component of the invention comprise means known as such for reducing the power of the optical communication signal at the output port, if the light intensity returning from the output port to the circulator exceeds a limit, so that in case of a defect the light intensity output at the output port can be reduced to a level that can not cause eye damage. At least in the beginning, the power should not be reduced to zero; rather, the reduced power should still be sufficient for carrying out a measurement of the propagation delay based on the reflected portion. When this measurement has been carried out successfully, the power may be reduced to zero.

A tap for monitoring the communication signal transmitted by the source is preferably located between the circulator and the output port, so that reflections which may be generated at the tap cannot return to the source. Such a tap is useful for establishing a ratio between the light intensity output at the output port and the light intensity returning from the output port to the circulator.

On the other hand, the object is achieved by an optical communication network comprising at least one fibre to which a component as described above is connected. Preferably, two such components are connected to each end of a bi-directional optical fibre, so that even in the worst case, the distance between a defect and a network component capable of estimating its distance from the defect is never more than half the length of the fibre.

Further features and advantages of the invention will become apparent from the subsequent description of embodiments referring to the appended drawings.

FIG. 1, already discussed, shows a highly schematic structure of a conventional network component;

Figure 1:
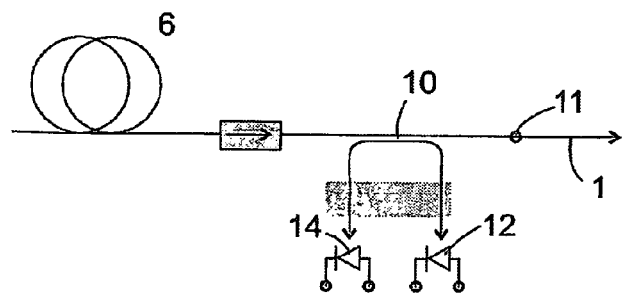
Figure 2:
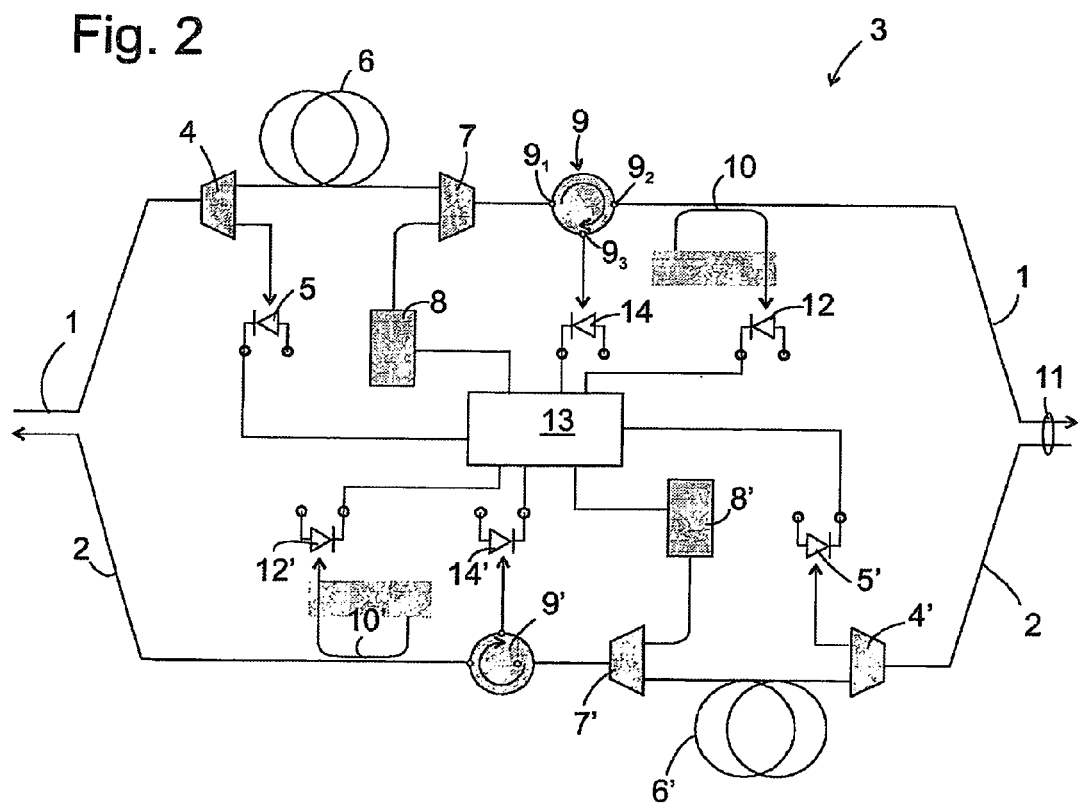
FIG. 2 shows a schematic structure of a network component according to a first embodiment of the invention.

FIG. 2 schematically show an intermediate amplifier for a bi-directional optical communication on a transmission line formed of two optical fibres, referred to here as west-east-fibre 1 and east-west-fibre 2, respectively. Intermediate amplifiers such as the amplifier 3 shown here are distributed at regular intervals along the connection for compensating the attenuation of the fibres 1, 2. The signals transmitted on the fibres 1, 2 are frequency-division multiplex signals comprising a plurality of payload channels at equal frequency intervals, on each of which one communication signal is conveyed, and at least one optical supervisory channel OSC and a filling channel. The supervisory channel conveys control information which is needed in the node of the network to which the connection belongs for controlling the payload channels and the information conveyed therein. The control information is exclusively internal information of network, which is not transmitted to the terminals connected to the network and which is transmitted in a format which is different from that of the payload channels, generally with a more robust modulation and coding. Usually, no information is conveyed in the filling channel; its optical power is controlled depending on the powers of the payload channels so as to keep the total power of the multiplex signal constant and thus to avoid intensity fluctuations of non-linear optical effects in the fibres 1, 2, which might otherwise deteriorate the signal-noise ratio.

In the following, mainly the structure and function of those components of the intermediate amplifier are described that are responsible for the transmission from west to east, being understood, that the same applies mutatis mutandis for transmission from east to west. Components for transmission from east to west have the same reference as their counterparts for west-east transmission, with a prime (') added.

A wavelength-division multiplex signal that arrives from the west on the west-east fibre 1 at intermediate amplifier 3 first passes an optical de-multiplexer 4 in which the OSC channel is separated from the other channels and is terminated at a light sensor 5 such as a photodiode. Payload and filling channels pass an amplifier stage, e.g. an erbium-doped fibre amplifier (EDFA) 6, and are recombined after amplification with an OSC newly generated by a transmitter laser 8 in a multiplexer 7. The wavelength-division multiplex, which is now complete again, passes a three-gate optical circulator 9 from a first gate $9_1$ to a second gate $9_2$ and reaches a directional coupler 10. The directional coupler 10 lets 99% of the intensity of the wavelength-division multiplex pass through to an output port 11 of the intermediate amplifier, to which an eastern branch of west-east fibre 1 is connected. The one percent of the intensity branched off at directional coupler 10 reaches a monitor photodiode 12 which provides a signal proportional to the received optical power to a control circuit 13. The control circuit 13 uses the signal from the monitor photodiode 12 for various purposes; one of these is to control the pump power—and, hence, the amplification—of the EDFA 6 so that the output signal of the monitor photodiode 12 is held at a constant level.

If the eastern branch of the fibre 1 is interrupted or disturbed, light of the wavelength-division multiplex is reflected at the location of the defect, and returns to the gate $9_2$ optical circulator 9 via output port 11. Similarly, light is reflected back directly at the output port 11 if no fibre is connected to it. This reflected light escapes from gate $9_3$ of the circulator and thus reaches a reflection photodiode 14, the output signal of which is also received by control circuit 13. The control circuit 13 continuously compares the signal levels of photodiodes 12 and 14 and detects that there is a defect of fibre 1 if the ratio between the reflection photodiode signal and the signal of the monitor photodiode 12 exceeds a pre-determined limit. If this happens, the control circuit 13 reduces the pump power for the EDFA 6 and/or the power of the transmitted laser 8 to a value which is no longer dangerous to the eye if the wavelength-division multiplex escapes into free space at the location of the defect.

At least the OSC power of the transmitter laser 8 is not set constantly to zero. Instead, the control circuit 13 modulates the transmitter laser 8 with a time marker at a selected instant, e.g. by generating a signal pulse of non-vanishing intensity. The information which is usually conveyed on the OSC need not be modulated onto the transmitter laser 8, since it must be assumed that the wavelength-division multiplex does not reach a network component which is located further to the east along the transmission line.

The control circuit 13 measures the time between emission of the time marker by the transmitter laser 8 and receipt of the time marker in a reflected signal at the reflection photodiode 14. This propagation time or a distance from the location of the defect calculated from it by the control circuit 13 is modulated on to a transmitter laser 8' as an information to be conveyed. This laser 8' is arranged in a specular relationship to transmitter laser 8 at the east-west fibre 2 and is used under normal operating conditions to generate an OSC for transmission on the east-west fibre 2. In this way, the information about the defect and its distance from intermediate amplifier 3 is transmitted to a network component located farther west along the transmission line and is switched by it to a central authority, where defect messages of this type from a plurality of components of the network are gathered. Based on this information and on the knowledge of the geographic course of the transmission line, the central authority is capable of delimiting the location of the defect and to send repair staff to the assumed location of the defect. Since such defects are mostly caused by excavations at construction sites, and construction sites are usually not difficult to find, a precision of the defect localisation in the order of several tens of meters or even more than 100 meters is sufficient to find the location of the defect quickly and to repair the defect.

Generally, for the propagation time measurement described above any channel of the wavelength-division multiplex, e.g. a filling channel or even a payload channel might be used. However, this would require a transmitter laser for the corresponding wavelength to be present at the node. Since such a transmitter laser 8, 8' for the regenerating the OSC is usually present in an intermediate amplifier, use of the OSC for the propagation time measurement is the most economic solution.

Figure 3:
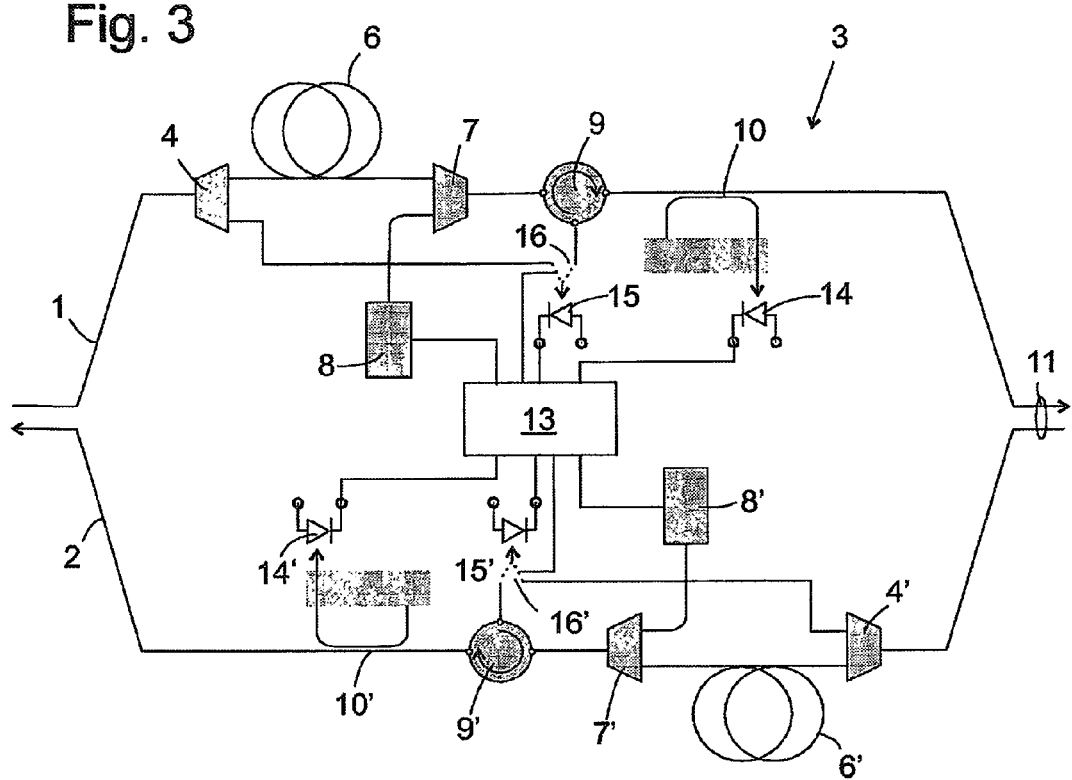
FIG. 3 shows a network component according to a second embodiment of the invention.

FIG. 3 shows a second embodiment of the intermediate amplifier 3, wherein components that are identical with those of the embodiment of FIG. 2 bear the same reference numerals and are not described anew. In the embodiment of FIG. 3, the receiver photodiode 5 for the OSC arriving from the west and the reflection photodiode 14 of the embodiment of FIG. 2 are replaced by a photodiode 15 which may selectively be connected under the control of control circuit 13 to the OSC output of multiplexer 7 or to the third gate of circulator 9. The transmittivity of switch 16 from circulator 9 to photodiode 15 is not exactly zero, even if the latter is connected to the multiplexer 7 by the switch 16, so that a certain appearance of a reflection returning from output port 11 is detected by the photodiode 15 even under normal operating condition and causes a rise of the output signal of the photodiode 15 and/or deterioration of the OSC signal received at the photodiode 15, which is noted by the control circuit 13 and is recognized as an indication of a defect in the eastern portion of fibre 1. The control circuit 13 reacts thereupon by reducing, as described referring to FIG. 2, by reducing the output power of wavelength-division multiplex at port 11 and by toggling the switch 16 so that the photodiode 15 now only receives the reflected signal via the optical circulator 9. The measurement of the signal propagation time to the defect and back and the transmission of the information thus obtained on the OSC of the east-west fibre 2 are carried out as described above referring to FIG. 2.

Figure 4:
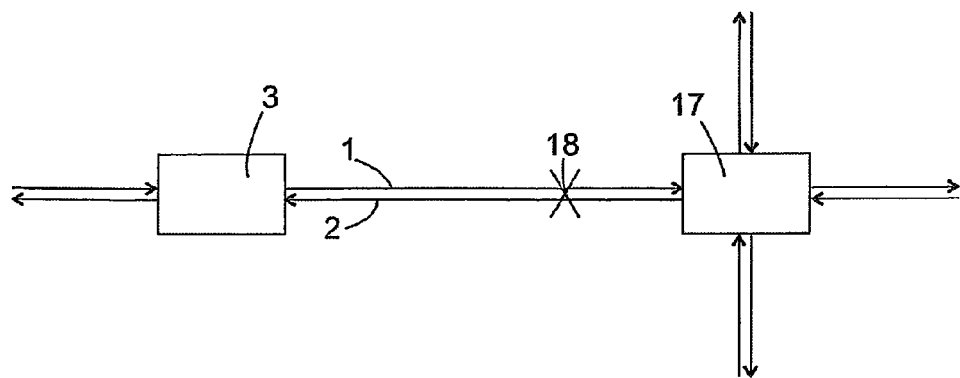
FIG. 4 a section of a network according to the invention.

FIG. 4 shows a section of a network in which the present invention is applied. The intermediate amplifier 3 is represented as a single block through which the fibres 1, 2 pass, and a network node 17 forms a termination of the fibres 1, 2 in eastward direction. The structure of the network node 17 is similar to that of the intermediate amplifier 3; the components of the intermediate amplifier described above are present in the network node 17, too, and are switched accordingly; the main difference is a switching fabric located between the de-multiplexer 4 and the EDFA 6 or between the EDFA 6 and the multiplexer 7.

Accordingly, both the intermediate amplifier 3 and the network node 17 are able to detect a defect 18 of the fibres 1, 2 independently from one another and to measure the distance from the defect 18. In the present case, the defect 18 is much closer to network node 17 than to the intermediate amplifier 3. It may therefore happen that the time marker signal emitted by transmitter laser 8 of the intermediate amplifier 3 is attenuated so much on its way to the defect 18 and back on the fibre 1 that its intensity, when arriving again at the intermediate amplifier 3, is no longer sufficient for an exact measurement of propagation time, because the propagation distance is much longer than the length of the fibre portion between the intermediate amplifier 3 and the network node 17. In this case, however, the network node 17 will be capable of measuring its distance from the defect 18, so that in any case a useful measurement of the position of the defect 18 is obtained.

The invention claimed is:

1. An optical communication network component comprising:
   an optical information signal source to provide an optical information signal;
   an output port to output the optical information signal over a first optical transmission fiber;
   a light sensor;
   an optical circulator to transmit the optical information signal from the optical information signal source to the output port, and to transmit reflected light from the output port to the light sensor;
   a first transmitter laser configured to associate a time marker with the optical information signal provided by the optical information signal source;
   an evaluating circuit coupled to the light sensor to detect a time delay between the time marker and a corresponding time marker associated with the received light arriving at the light sensor; and
   a second transmitter laser to transmit a value representative of the detected time delay over a second optical transmission fiber.

2. The component of claim 1 wherein the optical information signal comprises a frequency-division multiplex communication signal, and wherein the light sensor is configured to selectively sense one or more frequency components of the frequency-division multiplex communication signal.

3. The component of claim 2 wherein the one or more frequency components selectively sensed by the light sensor comprises a filling channel, and wherein an optical power of the filling channel is controlled based on powers of payload channels so as to maintain a total power of the optical information signal constant.

4. The component of claim 2 wherein the one or more frequency components selectively sensed by the light sensor comprises an OSC channel.

5. The component of claim 4 wherein the light sensor comprises an OSC receiver.

6. The component of claim 1 further comprising:
   an input port connected to the second optical transmission fiber;
   an optical switch; and
   a receiver selectively connected to the second optical transmission fiber or to the optical circulator via the optical switch.

7. The component of claim 6 wherein the optical switch is controlled based on an intensity of the light reflected from the output port to the optical circulator.

8. The component of claim 7 wherein the optical information signal source, the first transmitter laser, and the evaluating circuit are configured to reduce a power of the optical information signal at the output port if the intensity of the light reflected from the output port to the optical circulator exceeds a threshold.

9. The component of claim 8 wherein the evaluating circuit is configured to determine the time delay responsive to reducing the power of the optical information signal.

10. The component of claim 1 further comprising a tap disposed between the optical circulator and the output port to monitor the optical information signal provided by the optical information signal source.

11. An optical communication network comprising:
a bi-directional optical fiber; and
an optical component connected at a first end of the bi-directional optical fiber and comprising:
an optical information signal source to provide an optical information signal;
an output port to output the optical information signal over the bi-directional optical fiber;
a light sensor;
an optical circulator to transmit the optical information signal from the optical information signal source to the output port, and to transmit reflected light from the output port to the light sensor;
a first transmitter laser configured to associate a time marker with the optical information signal provided by the optical information signal source; and
an evaluating circuit coupled to the light sensor to detect a time delay between the time marker and a corresponding time marker associated with the reflected light arriving at the light sensor.

12. The optical communication network of claim 11 wherein the optical component comprises an intermediate amplifier, and further comprising a second optical component connected at a second end of the bi-directional optical fiber.

13. The optical communication network of claim 12 wherein each of the optical components are configured to independently detect a defect in the bi-directional optical fiber based on the detected time delay.

14. The optical communication network of claim 13 wherein each of the optical components are further configured to measure a distance to the defect in the bi-directional optical fiber to determine a position of the defect.

15. The optical communication network of claim 12 wherein the second optical component comprises an intermediate amplifier.

16. The optical communication network of claim 12 wherein the second optical component comprises a network node.

17. The optical communication network of claim 11 further comprising a second transmitter laser to transmit a value representative of the detected time delay over a second optical transmission fiber.

18. The optical communication network of claim 17 further comprising a switch disposed between the optical circulator and the light sensor.

* * * * *